United States Patent Office 3,179,666
Patented Apr. 20, 1965

3,179,666
METHOD OF TREATING BENZO-
THIAZYLDISULFIDE
Paul R. Wood, Naugatuck, Conn., assignor to United
States Rubber Company, New York, N.Y., a corporation of New Jersey
No Drawing. Filed May 4, 1962, Ser. No. 192,336
6 Claims. (Cl. 260—306.5)

This invention relates to rubber chemicals, and more particularly to a method of treating the rubber vulcanization accelerator benzothiazyldisulfide to improve its physical form so that a better dispersion of the benzothiazyldisulfide in rubber may be obtained.

Benzothiazyldisulfide, also known as 2,2' - dithiobisbenzothiazole, is produced in well known manners by oxidizing an aqueous slurry of mercaptobenzothiazole under acid conditions with nitrous oxide, or by oxidizing an aqueous solution of the sodium salt of mercaptobenzothiazole under neutral or alkaline conditions with chlorine. The benzothiazyl reaction product is insoluble in water and the resultant slurry is filtered and the filter cake is washed and dried to a water content of not more than 0.5%. The dried filter cake is treated in a pulverizing mill to give the commercial powder. Regardless of the chemical conditions of manufacture, the resultant benzothiazyldisulfide (herein after sometimes called MBTS) powder consists of small platy (or flat or leaflet) crystals. These platy crystal particles are about 1 to 10 microns, and generally about 5 microns, in average cross sectional linear dimension on the face or flat surface, and have a thickness, $\frac{1}{10}$ to $\frac{1}{20}$ of the average cross sectional linear dimension. They can be likened to sheets of paper. In compounding rubber with MBTS on the rubber mill, the MBTS sticks to the back roll and flakes are formed in which the individual platy crystal particles are pressed together to the extent that they adhere sufficiently to remain as undispersed material in the finished rubber stock. The conditions which obtain in a Banbury mixer are more severe and also produce poor dispersions of the MBTS in the rubber. In the general scientific field, it has been known for some time that when two crystalline particles of a material are pressed together, actual fusion can occur. In some cases, this is useful, such as pressure spot welding. In other cases, it is undesirable, such as when moving metal parts fuse in a machine. When this effect is undesirable, the solution to the problem is to find a means of preventing the area of fusion from growing. It is almost impossible to prevent initial fusion, but if the area is small, then the same motion resulting in the initial fusion will probably be sufficient to break the weld. In machinery parts, microscopic fusion occurs but further growth is blocked by oriented layers of polar molecules in the lubricating oil. This same mechanism probably explains why certain additives such as polyvalent metal soaps and oils improve the dispersion quality of MBTS. However I conclude, unlike machinery parts and other massive crystalline particles, this method of preventing growth of the welded area of MBTS is not enough. I conclude that the initial area of fusion between MBTS particles is too great to allow rupture of the particles. The initial area is large because of the shape of the MBTS crystals. Extremely thin particles are easily deformed so that microscopic surface irregularities do not prevent a large area of contact. I conclude that MBTS is difficult to disperse because of this very fact. The thin paper-like crystals deform under even slight pressure resulting in large fused areas.

The present invention overcomes these difficulties by changing the physical character of the MBTS particles.

According to the present invention, the platy crystal particles of MBTS are transformed into nodular granules the thickness of which is approximately equal to the other linear dimensions and which contain not more than 5% of the original platy crystal particles or platy particles of the size of the original crystal particles. Such nodular granules or particles, the thickness of which is equal to the other dimensions of the particles do not deform under pressure and small fused areas result, which are then broken by the motion causing the pressure in the first place.

In carrying out the present invention, the platy or leaflet crystal particles of MBTS containing not more than 2% water are fused into a cohesive mass and the cohesive mass is ground into nodular granules having approximately the same linear dimension in any direction, or so-called average particle diameter, which may be from 15 to 100 microns, and is preferably 20 to 50 microns average particle diameter, and which ground product contains not more than 5% of the original platy crystal particles or platy particles of the size of the original crystal particles, i.e., the ground nodular granules contain not more than 5% of particles resembling the original platy crystal particles. When the particles are ground too fine, the effectiveness of the invention is reduced. Large particles are to be avoided since it is desired to have as fine a dispersed particle in the rubber as possible.

The platy or leaflet crystal particles of MBTS may be fused together into a cohesive mass in various manners. The MBTS platy crystals may be fused into a hard solid mass by melting and quickly cooling the mass. The MBTS melts at about 170° C. and decomposes at or near the melting point so that the melting and cooling of the MBTS must be done quickly to prevent loss. Another method of fusing the MBTS platy crystals into a cohesive mass is to compact or compress the MBTS crystals containing not more than 2% water under high pressure until the MBTS fuses into a hard solid mass. The cohesive mass, which results from this compaction of the loose MBTS crystals is similar to the mass of MBTS cooled from the melt. Suitable commercial grinding equipment is readily available to grind the cohesive mass into nodular granules of the desired size. I have found that an excellent type of grinder for comminuting the cohesive mass of MBTS is the type that uses high speed rotating hammers to break up the mass and then uses rotating classifier blades to allow passage of the proper size particles from the grinding chamber.

Howey, U.S. Patent No. 2,734,064, discloses masticating the wet filter cake containing 18% to 80% and preferably 45% to 65% water to reduce its size before drying and grinding. Other patents disclose forming agglomerates, aggregates, pellets, etc. from water slurries or pastes of MBTS. In all these products, the original platy crystal particles retain their identity and in no case is there formed a cohesive mass which on grinding gives the nodular particles of the present invention with not more than .5% of the original platy crystal particles, or particles resembling these original particles which might result during grinding. In fact, I have found it impossible to obtain the necessary fusion of the MBTS crystals if the moisture level of the starting MBTS crystals is above two percent.

The following examples illustrate the invention. All parts and percentages referred to herein are by weight.

*Example 1*

In this example and in the other examples, the starting material was a commercial MBTS powder. It was made by the oxidation of the sodium salt of mercaptobenzotiazole in aqueous solution with sodium carbonate and chlorine to give an aqueous slurry of about 10% concentration of MBTS, which was filtered, and the filter cake washed, dried, passed through a pulverizer to break up normal filter cake lumps, and screened. The product was the conventional MBTS powder containing less than 0.5% moisture and was composed of platy crystals having an average linear dimension on the face or flat surface of about 5 microns and a thickness of $\frac{1}{20}$ to $\frac{1}{10}$ of this size, viz. about 0.2 to 0.5 micron.

A sample of the MBTS powder was melted rapidly in a beaker placed in an oil bath at 250° C. The sample was completely molten at 170° C. within five minutes. The melt was at once cooled into a thin sheet ($\frac{1}{16}$ inch thick) on a chilled surface. Assay of the starting material was 92% MBTS. Assay of the cooled sheet was 90% MBTS. Similar results were obtained when MBTS was melted on a hot, two roll, rubber mill and in a hot, screw type extruder. This material was then ground in a grinder employing rotating hammers and classifier blades, forming nodular granules having an average particle size of 25 microns. The product contained less than 5% platy crystals resembling the original MBTS crystals. Bulk density of the finished powder was 31.5 pounds per cubic foot.

*Example 2*

A sample of the MBTS powder was passed through bare tight rolls of a regular 12-inch two roll rubber mill. The two metal rolls were 6 inches in diameter and 12 inches long. The front roll r.p.m. (revolutions per minute) was 44 and the back roll r.p.m. was 56. The bare rolls were tightened until they touched. When the MBTS powder was added, the pressure backed the rolls up to take up the slack on the screw threads. The MBTS was fed continuously and it was compacted on the back roll as it passed around several times. When fully compacted into hard flakes, it fell off leaving a bare spot on the back roll. The front roll remained bare throughout the operation. The bare spot on the back roll filled up with more MBTS and got fully compacted after it passes several times through the high pressure zone. In this way, a continuous fall-off of compacted MBTS occurred. No external heat was applied to the rolls. The compacted flakes were about .03 inch thick and never exceeded a temperature, caused by the compaction effort, of 60° C. These hard flakes were then ground to nodular granules of an average particle diameter of 25 microns as in Example 1. Bulk density was 31.0 pounds per cubic foot.

*Example 3*

A sample of the MBTS powder was passed through the rolls of a machine called a "Chilsonator," made by the Fitzpatrick Company, Chicago, Ill. In principle, it is similar to a two roll rubber mill. The model number of the machine was Model SN. Both rolls were 6" in diameter and 7" long. The speed of both rolls was 20 r.p.m. The surfaces of both rolls were grooved. No external heat was applied. The pressure between the rolls can be varied by a combination of applied air and hydraulic pressure. The figures used were 35 pounds of air and 1400 pounds of hydraulic pressure. In this machine, the MBTS was transformed into a cohesive mass and became fully compacted as it passed once through the high pressure zone and it came off in a continuous hard grooved sheet. None of the material stayed on either roll. The thickness of the hard compacted sheet varied from about .01 inch at the bottom of each groove to about .05 inch at the thickest portion. Again the temperature rise was never above about 60° C. This hard material was ground as in Example 1 to an average particle diameter of about 25 microns. Bulk density was 31.3 pounds per cubic foot.

In comparative tests of regular MBTS, i.e., the commercial MBTS powder starting material of Examples 1 to 3, with the final MBTS products of Examples 1 to 3, which are illustrative of the products of the present invention, dispersion quality was determined by making a 20% master-batch in pale crepe rubber using both a rubber mill and a Banbury. Final dispersion quality was determined by visual inspection of a stretched thin film of the stock. In the rubber mill test and in the Banbury test, the regular MBTS was very poorly dispersed. The MBTS products of Examples 1 to 3 gave good dispersions in the rubber in both the rubber mill and Banbury tests, and showed great improvement in ability to disperse in the rubber, as compared with the regular commercial MBTS. Known additives to improve the dispersion quality of regular MBTS, such as polyvalent metal soaps and oils may be incorporated in the MBTS products of the present invention with further improvement in their dispersion quality.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of improving the dispersion quality of benzothiazyldisulfide produced by the oxidation of mercaptobenzothiazole which comprises fusing the platy crystals of benzothiazyldisulfide containing not more than 2% of water into a cohesive mass, and grinding said cohesive mass into nodular granules.

2. The method of improving the dispersion quality of benzothiazyldisulfide produced by the oxidation of mercaptobenzothiazole which comprises fusing the platy crystals of benzothiazyldisulfide containing not more than 2% of water into a cohesive mass, and grinding said cohesive mass into nodular granules having an average particle diameter of 15 to 100 microns.

3. The method of improving the dispersion quality of benzothiazyldisulfide produced by the oxidation of mercaptobenzothiazole which comprises melting and cooling the platy crystals of benzothiazyldisulfide containing not more than 2% of water to form a cohesive mass, and grinding said cohesive mass into nodular granules.

4. The method of improving the dispersion quality of benzothiazyldisulfide produced by the oxidation of mercaptobenzothiazole which comprises melting and cooling the platy crystals of benzothiazyldisulfide containing not more than 2% of water to form a cohesive mass, and grinding said cohesive mass into nodular granules having an average particle diameter of 20 to 50 microns.

5. The method of improving the dispersion quality of benzothiazyldisulfide produced by the oxidation of mercaptobenzothiazole which comprises compacting the platy crystals of benzothiazyldisulfide containing not more than 2% of water under pressure until they form a cohesive mass in which the platy crystals are fused, and grinding said cohesive mass into nodular granules.

6. The method of improving the dispersion quality of benzothiazyldisulfide produced by the oxidation of mercaptobenzothiazole which comprises compacting the platy crystals of benzothiazyldisulfide containing not more than 2% of water under pressure until they form a cohesive mass in which the platy crystals are fused, and grinding said cohesive mass into nodular granules having an average particle diameter of 20 to 50 microns.

References Cited by the Examiner

UNITED STATES PATENTS

| | | | |
|---|---|---|---|
| 2,830,058 | 4/58 | Young | 260—306.5 |
| 3,033,876 | 5/62 | Blose | 260—306.5 |

FOREIGN PATENTS

| | | |
|---|---|---|
| 475,307 | 7/51 | Canada. |
| 543,880 | 7/57 | Canada. |

OTHER REFERENCES

Perry: Chemical Engineer's Handbook, third edition (New York, 1950), pages 1110–1116 and 1147–60.

NICHOLAS J. RIZZO, *Primary Examiner.*